C. M. SWEET.
ATTACHMENT FOR DIAL SCALES.
APPLICATION FILED JUNE 20, 1919.
1,327,450.
Patented Jan. 6, 1920.
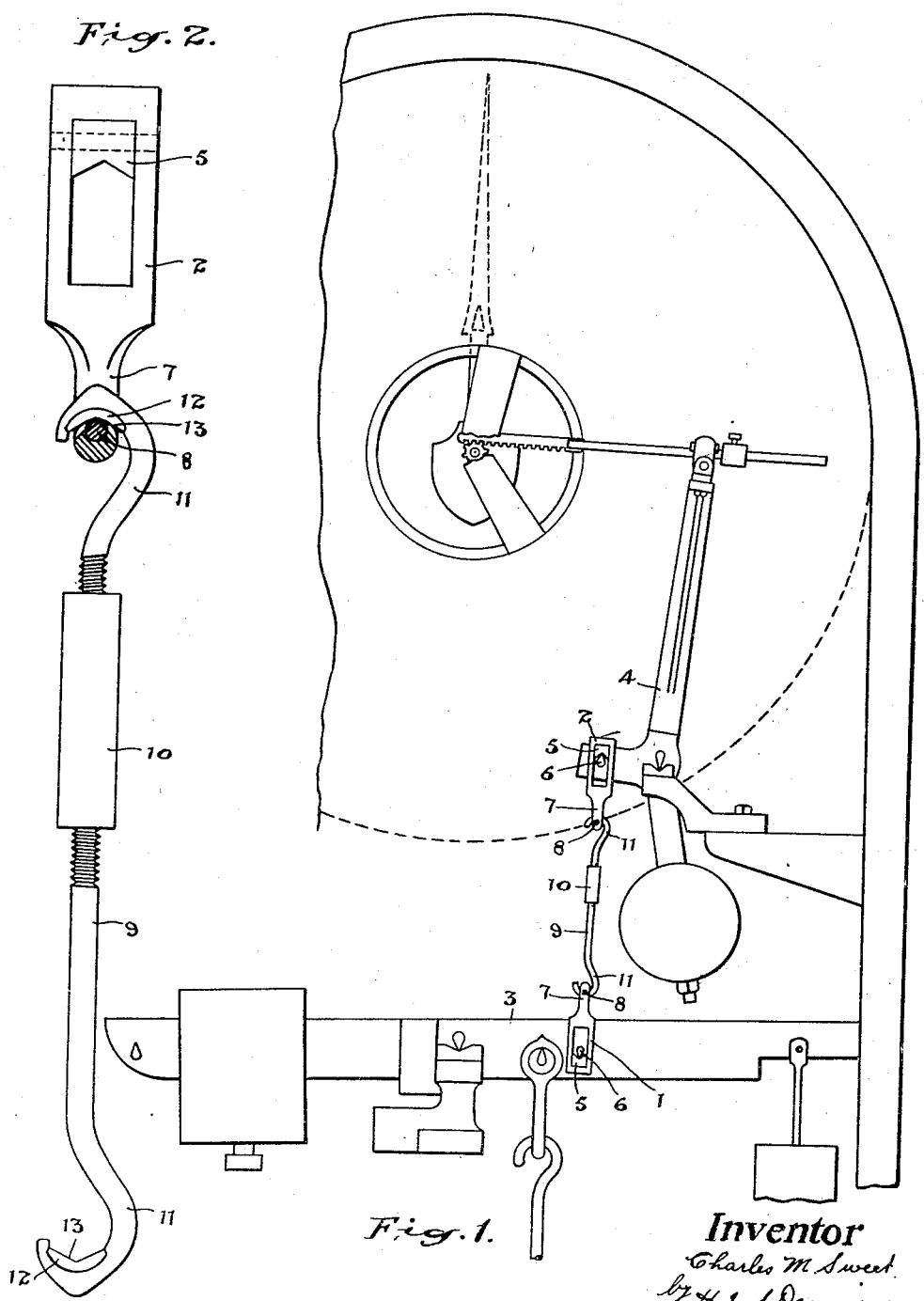

UNITED STATES PATENT OFFICE.

CHARLES MELVIN SWEET, OF HAMILTON, ONTARIO, CANADA, ASSIGNOR TO THE GURNEY SCALE COMPANY, OF HAMILTON, ONTARIO, CANADA.

ATTACHMENT FOR DIAL-SCALES.

1,327,450.      Specification of Letters Patent.      Patented Jan. 6, 1920.

Application filed June 20, 1919. Serial No. 305,470.

*To all whom it may concern:*

Be it known that I, CHARLES MELVIN SWEET, a citizen of the United States of America, and resident of the city of Hamilton, county of Wentworth, in the Province of Ontario, in the Dominion of Canada, have invented certain new and useful Improvements in Attachments for Dial-Scales, as described in the following specification and illustrated in the accompanying drawings, that form part of the same.

The principal objects of the invention are, to correctly maintain the adjustment between the scale beam and pendulum through which the dial indicator is operated, and to devise a simple and effective connection between the scale beam and pendulum which will not be liable to get out of order.

The principal feature of the invention consists in the novel construction and arrangement of the link and shackles forming the operating connection between the scale beam and the pendulum, whereby the movable connections are provided with standard pivot structures.

In the drawings, Figure 1 is an elevational view from the rear side of a scale showing the arrangement of my improved connection to a beam and the indicator pendant.

Fig. 2 is an enlarged elevational view of the connecting link with one of the shackles being shown in section.

It is found that in the numerous connections of a dial scale between the beam and the indicating dial that a very slight inaccuracy in any one of the connections multiplies and results in a serious discrepancy on the scale dial and in the type of scale disclosed in my co-pending application No. 176,572 the link connection between the beam and the pendulum was subjected to wear and inaccuracy of adjustment and that even very slight inaccuracies produced undesirable results.

In order to overcome these difficulties I have constructed the shackles 1 and 2 arranged upon the beam 3 and pendulum 4 respectively with notched bearing blocks 5 to engage the knife edged pivots 6 and the loop 7 of these shackles has arranged transversely therein a hardened steel pin 8 which is shaped to a knife edge.

A link 9 is formed in two sections adjustably connected with the turn buckle 10 and each of the hooks 11 is formed with an inserted block 12 having the inner surface formed with a V notch 13 to receive the bearing edge of the pin 8 in the shackle loop.

From this description it will be readily seen that the shackles are connected to the beam and the pendulum by a standard self-centering knife edge bearing. The points of contact between the links and the shackles are also of the knife-edge self-centering type, consequently every point of movement is a knife bearing and no matter what action occurs between the pendulum and the beam these bearings will always aline themselves without the slightest loss.

The improvement herein described is simple and yet very effective and most desirable results are achieved thereby in maintaining the accuracy of the scale, as there is practically no wear and whatever wear there is is uniform and centralized and may be taken up by means of the adjustment provided.

What I claim as my invention is:—

1. In an attachment for dial scales, the combination with the scale beam and pendulum, each having projecting knife edge pivots, of shackles connected to said beam and pendulum through said knife edge pivots, and a link connecting said shackles and having knife edge bearing contact therewith.

2. In an attachment for dial scales, the combination with the scale beam and pendulum, each having projecting knife edge pivots, of shackles connected to said beam and pendulum through knife edge pivots, said shackles having knife-edged bearings in their loops, and a link arranged between said shackles having hooked ends provided with hardened notched bearings to engage the knife bearings of said shackles.

3. In an attachment for dial scales, the combination with the scale beam and pendulum, each having projecting knife pivots, of shackles having inserted V notches bearing blocks adapted to engage said knife pivots and each provided with a hardened knife edge pin extending transversely of the loop, and a link formed with hooked ends having inserted bearing blocks formed with V-shaped notches adapted to operatively engage the transverse pins in the shackle loops.

4. In an attachment for dial scales, the combination with the scale beam and pendulum, of shackles supported on knife bearings in said beam and said pendulum, a link connecting said shackles and formed with self-centering bearing ends, said link being divided and provided with a longitudinally adjustable turn buckle.

CHARLES MELVIN SWEET.

Witnesses:
GEO. W. BRITTON,
ARTHUR WHITE.